United States Patent
Misumi et al.

(10) Patent No.: US 11,106,558 B2
(45) Date of Patent: Aug. 31, 2021

(54) SENSOR OPENING TEST SYSTEM, SENSOR OPENING TEST MANAGEMENT TERMINAL, SENSOR, SENSOR OPENING TEST METHOD, AND COMPUTER PROGRAM

(71) Applicant: OMRON Corporation, Kyoto (JP)

(72) Inventors: Shuichi Misumi, Kyoto (JP); Tetsuji Yamato, Yokohama (JP)

(73) Assignee: OMRON Corporation, Kyoto (JP)

( * ) Notice: Subject to any disclaimer, the term of this patent is extended or adjusted under 35 U.S.C. 154(b) by 57 days.

(21) Appl. No.: 16/346,550

(22) PCT Filed: Sep. 21, 2017

(86) PCT No.: PCT/JP2017/034017
§ 371 (c)(1),
(2) Date: May 1, 2019

(87) PCT Pub. No.: WO2018/088039
PCT Pub. Date: May 17, 2018

(65) Prior Publication Data
US 2019/0258553 A1    Aug. 22, 2019

(30) Foreign Application Priority Data

Nov. 14, 2016 (JP) .............................. JP2016-221798

(51) Int. Cl.
*G06F 11/22* (2006.01)
*G06F 11/30* (2006.01)
(Continued)

(52) U.S. Cl.
CPC .......... *G06F 11/2273* (2013.01); *G06F 11/22* (2013.01); *G06F 11/2236* (2013.01);
(Continued)

(58) Field of Classification Search
None
See application file for complete search history.

(56) References Cited

U.S. PATENT DOCUMENTS

2007/0032933 A1    2/2007 Glaser
2008/0208367 A1    8/2008 Koehler et al.
(Continued)

FOREIGN PATENT DOCUMENTS

JP    2006525912 A    11/2006
JP    2013152557    *    8/2013
JP    5445722 B1    3/2014

OTHER PUBLICATIONS

Extended European search report (EESR) dated Dec. 3, 2019 in a counterpart European patent application.
(Continued)

*Primary Examiner* — Charles E Anya
(74) *Attorney, Agent, or Firm* — Metrolex IP Law Group, PLLC

(57) ABSTRACT

The present invention is provided with a sensor-side metadata acquiring unit that acquires sensor-side test metadata, an application-side metadata acquiring unit that acquires application-side test metadata, a matching unit that determines matching of acquired sensor-side test metadata and acquired application-side test metadata, and a dataflow control command instructing unit that transmits a dataflow control command instructing test data flow to an opening test application from a sensor or network adaptor specified by matched sensor-side test metadata and the application-side test metadata.

14 Claims, 12 Drawing Sheets

(51) Int. Cl.
*H04M 11/00* (2006.01)
*H04Q 9/00* (2006.01)

(52) U.S. Cl.
CPC .......... *G06F 11/30* (2013.01); *G06F 11/3003* (2013.01); *H04M 11/00* (2013.01); *H04Q 9/00* (2013.01)

(56) References Cited

U.S. PATENT DOCUMENTS

| | | |
|---|---|---|
| 2012/0089708 A1 | 4/2012 | Kim et al. |
| 2014/0340526 A1* | 11/2014 | Miura .................. H04N 17/002 348/175 |
| 2014/0372561 A1 | 12/2014 | Hisano |
| 2015/0288868 A1* | 10/2015 | Slavin .................... H04N 7/181 348/159 |
| 2016/0210862 A1 | 7/2016 | Hisano |
| 2016/0267239 A1* | 9/2016 | Kanigicherla ......... G16H 20/30 |

OTHER PUBLICATIONS

English translation of the International Search Report of PCT/JP2017/034017 dated Dec. 12, 2017.
Written Opinion of PCT/JP2017/034017 dated Dec. 12, 2017.

\* cited by examiner

Assign sensor identifier to sensor network adapter 2

Assign sensor identifiers to sensors 1a-1c

FIG. 5

| Type | Test mode |
|---|---|
| Valid period | Until August 9, 2016 |
| UUID | a0eebc99ac0b4ef8bb6d6cb9bd380a11 |
| Communication source ID | Sensor network adapter 2 |

FIG. 6

| Type | Test mode |
|---|---|
| Valid period | Until August 9, 2016 |
| UUID | a0eebc99ac0b4ef8bb6d6cb9bd380a11 |
| Communication destination ID | Application server 3 |

FIG. 8

| Type | Test mode |
|---|---|
| Valid period | Until August 9, 2016 |
| UUID | a0eebc99ac0b4ef8bb6d6cb9bd380a11 |
| Communication destination ID | Application server 3 |
| Retrieval availability | Disabled |

FIG. 10

| Type | Test mode |
|---|---|
| Valid period | Until August 9, 2016 |
| UUID | a0eebc99ac0b4ef8bb6d6cb9bd380a11 |
| Communication destination ID | Application server 3 |
| Retrieval availability | Enabled |

SENSOR OPENING TEST SYSTEM, SENSOR OPENING TEST MANAGEMENT TERMINAL, SENSOR, SENSOR OPENING TEST METHOD, AND COMPUTER PROGRAM

TECHNICAL FIELD

The present invention relates to a technology for performing opening testing of a sensor that is newly installed.

RELATED ART

A technology called a sensor network is being investigated. This technology enables collection, management and seamless usage of sensing data, by installing sensor devices (hereinafter, also simply "sensors") having a sensing function and a communication function in various locations or industrial facilities and networking these sensors.

Generally, sensors are installed in order to collect data required by the owner of the sensor. Thus sensors are often not used except when the owner is collecting data (either the sensor itself is not operating or the sensing data is not used even through the sensor is operating). Thus sensing data has poor distributivity, which is limited to analysis and usage by the owner of the sensor no matter how significant that data might be to a third party. This results in resource redundancy between facilities and network congestion caused by communication between sensors installed in the respective facilities.

Also, a technology known as IoT (Internet of Things) is being investigated. This technology creates new value by combining information relating to numerous things that exists in the world on a network, and seamless deployment of a variety of services including social infrastructure is expected. In order to produce value from IoT, the state of things that are linked on the network needs to be known, and sensing and communication are thus important elemental technologies.

In view of this, it is necessary to enable various companies and organizations to use the vast amounts of sensing data collected throughout the world according to their individual objectives, by forming a sensor network such as the above. For example, added value is produced by processing data on an application server capable of processing big data, and economic effects are achieved by encouraging exchange of sensing data. For example, the owner of a sensor can obtain compensation by allowing data users to temporary use the sensor or by providing sensing data. Also, for the user, there is the advantage of being able to obtain required data cheaply since it is not necessary to invest in installation of a sensor.

In view of this, as in Patent Document 1 (JP 5445722), for example, inventions relating to a mechanism for appropriately distributing resources such as sensing data have been proposed.

With the invention described in Patent Document 1, matching between app-side metadata and sensor-side metadata is performed, and applications that require sensing data are associated with sensors capable of providing that data. A dataflow control command is then transmitted to a device that manages the sensors. Thereby, given that distribution of sensing data to which various conditions have been added is facilitated and services are improved, there are advantages for both providers and users of data. Here, metadata indicates information that is used in retrieval and matching by a server, and sensor-side metadata and application-side metadata respectively indicate information relating to a sensor and an attribute of sensing data that is obtained by the sensor and information relating to an application itself and an attribute of sensing data that is required by the application. Also, a dataflow control command is command information that includes information specifying a sensor which is the data provision source and an application which is the data use destination, and commands that data is distributed from the data provision source to the data use destination.

RELATED ART DOCUMENTS

Patent Documents

Patent Document 1: JP 5445722

SUMMARY OF THE INVENTION

Problems to be Solved by the Invention

Incidentally, in order to be able to utilize a newly installed sensor in the system of the invention described in Patent Document 1, it is necessary for metadata of the newly installed sensor to be normally matched with metadata of an opening checking application that checks whether data of the newly installed sensor can be received, and, furthermore, to check whether data of the newly installed sensor can be received in an opening test application, using a dataflow control command.

However, in the system of the invention described in Patent Document 1, sensor-side metadata and application-side metadata include large amounts of information. Accordingly, there is a problem in that, in the case where reception of sensor data fails at the time of opening checking of a newly installed sensor, it is difficult to know whether installation of the new sensor failed or whether matching failed due to an item of metadata that includes a large amount of information being incorrectly input.

The present invention has been made in view of the above problems, and an object thereof is to provide a technology that can efficiently perform opening testing of a sensor that is newly installed.

Means for Solving the Problems

The instant invention is a sensor opening test system including a sensor-side metadata acquiring unit configured to acquire sensor-side test metadata that is for use in opening testing and includes at least a sensor identifier uniquely identifying a sensor configured to output sensing data or a network adaptor connected to the sensor and configured to transmit sensing data to a network, an application-side metadata acquiring unit configured to acquire application-side test metadata that is metadata of an opening test application for use in opening testing of the sensor and includes at least the sensor identifier, a matching unit configured to determine matching of the acquired sensor-side test metadata and the acquired application-side test metadata, based on a sameness of the sensor identifiers, and an instructing unit configured to transmit, to a distribution device configured to manage distribution of the sensing data, a dataflow control command instructing test data flow to the opening test application from the sensor or network adaptor specified by the sensor-side test metadata and the application-side test metadata that are matched.

According to this configuration, in the case where reception of sensor data fails at the time of opening checking of a newly installed sensor, failed installation of the new sensor and failed matching of metadata can be distinguished, and an increase in the efficiency of opening test can be attained.

Also, according to this configuration, the resources of the processor that are required in matching processing for opening checking of a sensor can be reduced, and, furthermore, since failed installation of a sensor and failed matching of metadata can be distinguished, needless use of communication resources can be reduced.

Also, a configuration may be adopted in which the sensor-side test metadata includes information indicating that the metadata is metadata for use in opening testing, and information identifying a distribution source of sensing data of the sensor, and the application-side test metadata includes information indicating that the metadata is metadata for use in opening testing, and information identifying a distribution destination of sensing data of the sensor.

According to such a configuration, by clearly specifying metadata that is for use in opening testing, it is possible to retrieve only metadata for use in opening testing from among the vast amount of metadata. Furthermore, the time that this opening test takes from the processing for matching metadata until transmission of the dataflow control command can be shortened, by limiting metadata information to only information required in opening test.

Also, a configuration may be adopted in which the sensor opening test system has a metadata setting changing unit configured to change a setting of the sensor-side test metadata to enable acquisition of the sensor-side test metadata by the sensor-side metadata acquiring unit, or to change a setting of the application-side test metadata to enable acquisition of the application-side test metadata by the application-side metadata acquiring unit.

According to such a configuration, the start of opening test can be controlled externally.

Also, a configuration may be adopted in which the sensor opening test system has a test data reception state presenting unit configured to present a reception state of test data in the opening test application.

According to such a configuration, the reception state of test data in the opening test application can be checked.

Also, the sensor identifier may be a UUID (Universally Unique Identifier).

In this case, a UUID (Universally Unique Identifier) can be used as an identifier for uniquely identifying a sensor or a network adaptor.

Also, a sensor management terminal according to this invention is a sensor opening test management terminal in a sensor opening test system that, with respect to sensor-side test metadata that is for use in opening testing and includes at least a sensor identifier uniquely identifying a sensor configured to output sensing data or a network adaptor connected to the sensor and configured to transmit sensing data to a network and application-side test metadata that is metadata of an opening test application for use in opening testing of the sensor and includes at least the sensor identifier, determines matching of the sensor-side test metadata and the application-side test metadata, based on a sameness of the sensor identifiers, and performs opening testing of the sensor or the network adaptor, the sensor opening test management terminal including a setting changing unit configured to change a setting of the sensor-side test metadata or the application-side test metadata, such that the sensor-side test metadata or the application-side test metadata is targeted for matching, and a presenting unit configured to present a reception state, in the opening test application, of test data transmitted from the sensor or network adaptor.

According to this configuration, the technician-in-charge who carries out sensor opening test is able to control the start of sensor opening test at the site where the sensor is installed, and check the reception state of test data in the opening test application.

A sensor according to this invention is a sensor in a sensor opening test system that, with respect to sensor-side test metadata that is for use in opening testing and includes at least a sensor identifier uniquely identifying a sensor configured to output sensing data and application-side test metadata that is metadata of an opening test application for use in opening testing of the sensor and includes at least the sensor identifier, determines matching of the sensor-side test metadata and the application-side test metadata, based on a sameness of the sensor identifiers, and performs opening testing of the sensor, the sensor including a sensor configured to output sensing data, an opening test data transmitting unit provided with a function of a normal mode for transmitting the sensing data and a sensor opening test mode, and configured to transmit test data when in the sensor opening test mode, and a presenting unit configured to present a reception state, in the opening test application, of test data transmitted from the sensor.

According to this configuration, a sensor is able to execute sensor opening test autonomously, without any special equipment being prepared.

Also, a configuration may be adopted in which the sensor includes a setting changing unit configured to change a setting of the sensor-side test metadata or the application-side test metadata, such that the sensor-side test metadata or the application-side test metadata is targeted for matching.

According to this configuration, the start of opening test can be controlled by the sensor.

Also, a sensor opening test method according to this invention includes acquiring sensor-side test metadata that is for use in opening testing and includes at least a sensor identifier uniquely identifying a sensor configured to output sensing data or a network adaptor connected to the sensor and configured to transmit sensing data to a network, acquiring application-side test metadata that is metadata of an opening test application for use in opening testing of the sensor and includes at least the sensor identifier, determining matching of the acquired sensor-side test metadata and the acquired application-side test metadata, based on a sameness of the sensor identifiers, and instructing, to a distribution device configured to manage distribution of the sensing data, test data flow to the opening test application from the sensor or network adaptor specified by the sensor-side test metadata and the application-side test metadata that are matched.

According to this configuration, In the case where reception of sensor data fails at the time of opening checking of a newly installed sensor, failed installation of the new sensor and failed matching of metadata can be distinguished, and an increase in the efficiency of opening test can be attained.

Also, the resources of the processor that are required in matching processing for opening checking of a sensor can be reduced, and, furthermore, since failed installation of a sensor and failed matching of metadata can be distinguished, needless use of communication resources can be reduced.

Also, a computer program according to this invention is a computer program for causing a computer to execute processing for acquiring sensor-side test metadata that is for use in opening testing and includes at least a sensor identifier uniquely identifying a sensor configured to output sensing data or a network adaptor connected to the sensor and configured to transmit sensing data to a network, processing for acquiring application-side test metadata that is metadata of an opening test application for use in opening testing of the sensor and includes at least the sensor identifier, processing for determining matching of the acquired sensor-side test metadata and the acquired application-side test metadata, based on a sameness of the sensor identifiers, and processing for transmitting, to a distribution device configured to manage distribution of the sensing data, a dataflow control command instructing test data flow to the opening test application from the sensor or network adaptor specified by the sensor-side test metadata and the application-side test metadata that are matched.

According to this configuration, in the case where reception of sensor data fails at the time of opening checking of a newly installed sensor, failed installation of the new sensor and failed matching of metadata can be distinguished, and an increase in the efficiency of opening test can be attained.

Also, according to this configuration, the resources of the processor that are required in matching processing for sensor opening checking can be reduced, and, furthermore, since failed installation of a sensor and failed matching of metadata can be distinguished, needless use of communication resources can be reduced.

Effects of the Invention

The present invention is able to quickly perform opening testing of a sensor that is newly installed.

BRIEF DESCRIPTION OF THE DRAWINGS

FIG. 5 is a diagram showing an example of metadata for sensor-side testing.
FIG. 6 is a diagram showing an example of application-side test metadata.
FIG. 8 is a diagram showing an example of application-side test metadata in the second embodiment.
FIG. 10 is a diagram showing an example of application-side test metadata in the second embodiment.

EMBODIMENTS OF THE INVENTION

Embodiments of the present invention will be described with reference to drawings.

The present embodiment, a system that can efficiently perform opening testing of a sensor that is newly installed, in a system that distributes sensing data between a sensor-side that provides sensing data detected by a sensor and an application-side that provides a service using the sensing data, in order to use efficiently information of things that are connected to a network and constitute an IoT, will be described.

First Embodiment

Figure 1:
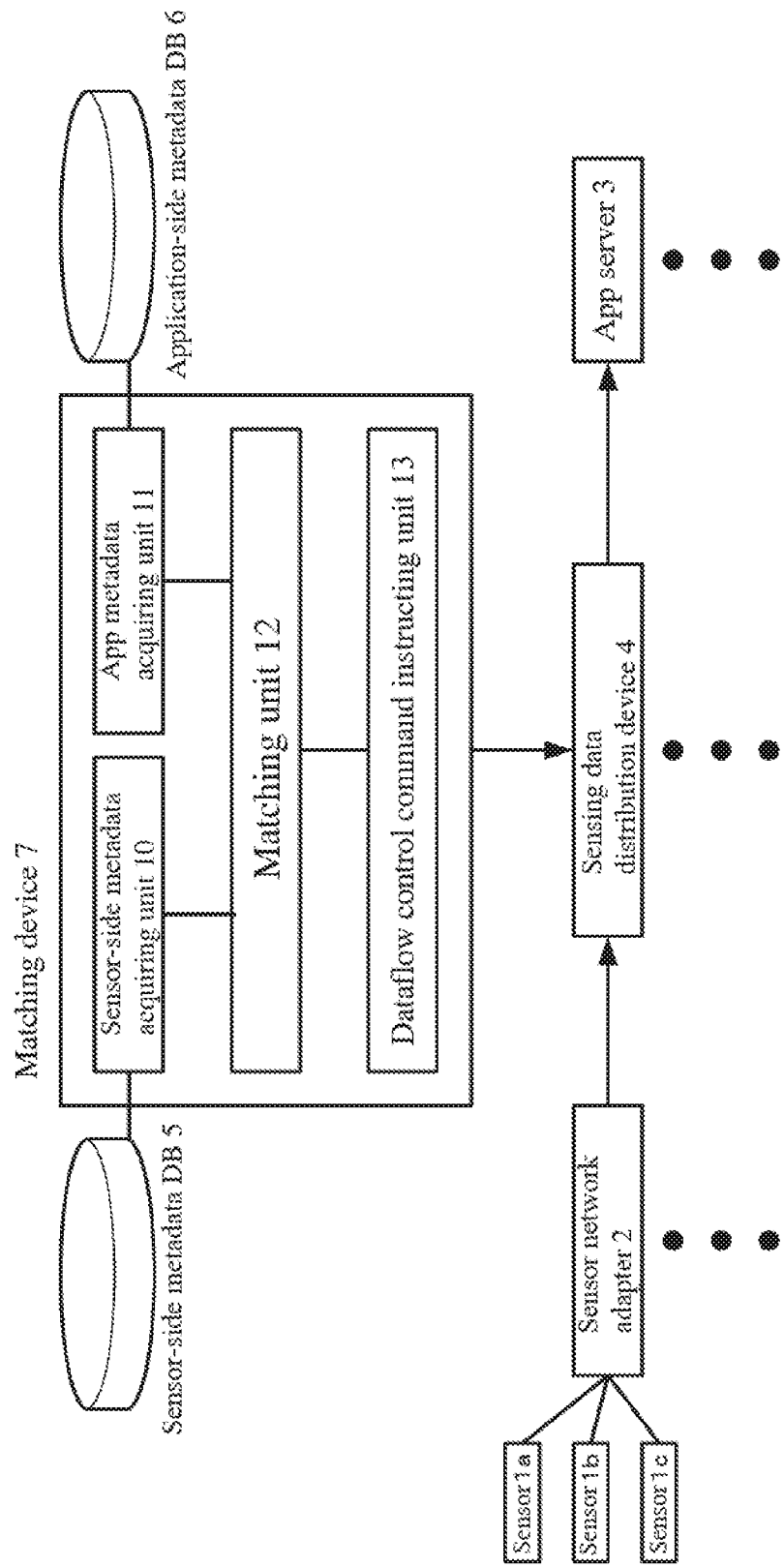
FIG. 1 is a block diagram of a first embodiment.

FIG. 1 is a block diagram of the first embodiment.
In FIG. 1, reference signs 1a to 1c denote sensors, and reference sign 2 denote a sensor network adaptor, reference sign 3 denote an application server (App server), reference sign 4 denote a sensing data distribution device, reference sign 5 denote a sensor-side metadata database, reference sign 6 is an application-side metadata database, and reference sign 7 denote a matching device.

The sensors 1a to 1c are devices that detect a certain physical quantity and changes in that physical quantity, and record or output the detection result as sensing data. A position sensor (GPS), an acceleration sensor and a pressure sensor are given as typical examples of a sensor, but a camera, a microphone, an input system and the like can be said to be sensors. Note that, in the present embodiment, the sensors 1a to 1c are newly installed sensors.

The sensor network adaptor 2 is physically or electrically connected to the sensors 1a to 1c and acquires sensing data. Also, the sensor network adaptor 2 performs predetermined processing on sensing data using an information processing device such as CPU. For example, processing for converting sensing data acquired from the sensors 1a to 1c into transmission packets is performed. Also, the sensor network adaptor 2 has a function of communicating with the outside, is capable of communicating with the sensing data distribution device 4 via a network. Also, at the time of sensor opening test (hereinafter, described as test mode), test data of each sensors 1a to 1c is transmitted to the sensing data distribution device 4 instead of sensing data of the sensors 1a to 1c. Test data may be any data that is known to be test data, examples of which include sensor recognition time and technician identification information that identifies the technician who carries out sensor installation. Note that the sensors 1a to 1c and the sensor network adaptor 2 may be integrated and provided within the same case. Also, in the case where the sensors themselves have a network connection function (communication function), a network adaptor is not required.

The application server 3 is a server that has an application that provides services using sensing data. Note that the application of the present embodiment is assumed to be an application for opening testing of the sensors 1a to 1c to check whether sensing data of the newly installed sensors 1a to 1c can be received correctly.

The sensing data distribution device 4 has a communication function, and is capable of communicating with the sensor network adaptor 2 and the application server 3. Specifically, the sensing data distribution device 4 receives sensing data from the sensor network adaptor 2, and distributes the received sensing data to the designated application server 3.

The sensor-side metadata database 5 is a database that stores sensor-side metadata which is information relating to sensors that output sensing data. The present embodiment describes an example in which the sensor-side metadata database 5 is provided separately from the matching device 7, and the sensor-side metadata database 5 and the matching device 7 are connected through a network, but the matching device 7 may be provided with the sensor-side metadata database 5.

Sensor-side metadata is information relating to sensors and attributes of sensing data obtained by the sensors that is used in the case of matching a sensor that provides sensing data detected by the sensor with an application that provide a service using the sensing data of that sensor. Examples of items of sensor-side metadata include data category, data item, measurement region, measurement date-time, device, distribution interval, and data specification. The data category is "indoor environment measurement", the data items are "temperature", "humidity", "sound pressure" and "acceleration", the measurement region is "Shiga Prefecture . . . ", the measurement date-time is "real time", the device is "device name", the distribution interval is "once/10 min", the data specification is "http://WWW.XXX", and the like.

Furthermore, in the present embodiment, sensor-side test metadata for opening testing of the sensors 1a to 1c that are newly installed is also stored, in addition to the abovementioned typical sensor-side metadata. The sensor-side test metadata includes at least sensor identifiers uniquely identifying the sensors 1a to 1c or the sensor network adaptor 2, and information relating to the communication source (distribution source) of the sensing data of the sensors 1a to 1c.

Figure 2:
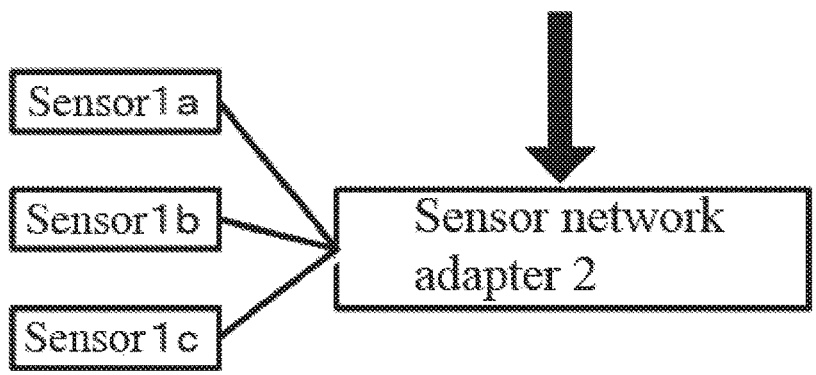
FIG. 2 is a diagram for illustrating a method of assigning a sensor identifier.
Figure 3:
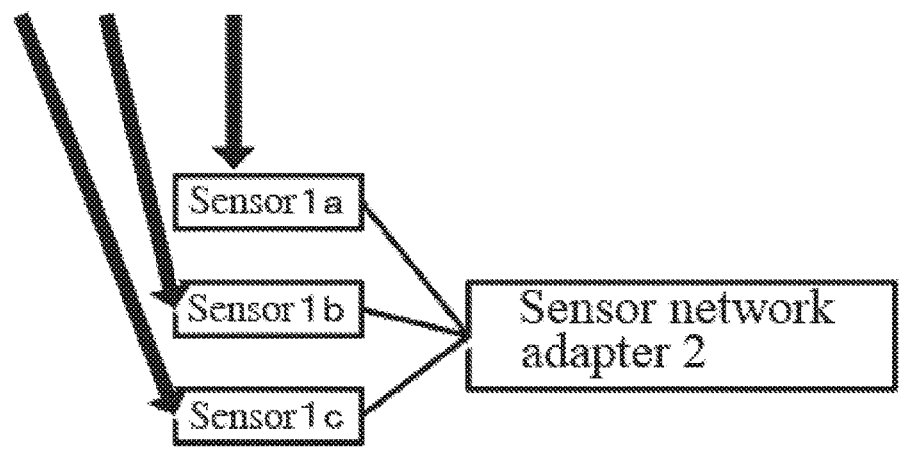
FIG. 3 is a diagram for illustrating a method of assigning a sensor identifier.

As shown in FIG. 2, in the case where a large number of sensors 1a to 1c are connected to the sensor network adaptor 2, and the sensor network adaptor 2 transmits sensing data of the sensors 1a to 1c to a network, a sensor identifier may be assigned to the sensor network adaptor 2 as representative of the sensors 1a to 1c. Also, in the case of wanting to recognize the sensors individually due to the wishes of the user on the application-side that uses the sensing data or for other reasons, sensor identifiers may be assigned individually to the sensors 1a to 1c, as shown in FIG. 3.

Also, a UUID (Universally Unique Identifier) is given as an example of a sensor identifier. A UUID is an identifier for uniquely identifying an object (in this example, the sensors 1a to 1c or the sensor network adaptor 2) on software. Note that, in the present embodiment, any variant of a UUID can be used as long as the sensors 1a to 1c or the sensor network adaptor 2 can be uniquely identified, examples of which include a UUID (version 1) that uses time and a MAC Address, a UUID (version 2) obtained by substituting a portion of the version 1 UUID with a POSIX user ID or group ID, a UUID that uses sort of unique name (byte sequence) such as a domain name and uses MD5 (version 3) or SHA1 (version 5) as a hash function, and a UUID (version 4) consisting of a random number.

Information relating to the communication source (distribution source) of sensing data of the sensors 1a to 1c is, in the present example, information relating to the sensor network adaptor 2 that transmits sensing data of the sensors 1a to 1c to the sensing data distribution device 4, an example of which includes an IP address of the sensor network adaptor 2.

The application-side metadata database 6 is a database that stores application-side metadata which is information relating to applications that provide services using sensing data.

Here, application-side metadata indicates information relating to an application itself and an attribute of the sensing data that is required by the application. Examples of items of application-side metadata include data category, data item, measurement region, measurement date-time, and device. The data category is "environment measurement", the data items are "temperature" and "humidity", the measurement region is "Shiga Prefecture . . . ", the measurement date-time is "real time", the device is "device name", and the like.

Furthermore, in the present embodiment, application-side test metadata for opening testing of the sensors 1a to 1c that are newly installed is also stored, in addition to the abovementioned ordinary application-side metadata. Application-side test metadata includes at least the abovementioned sensor identifier and information relating to the communication destination (distribution destination) of sensing data. In this example, information relating to the communication destination (distribution destination) is information relating to the application server 3, an example of which is an IP address of the application server 3.

The matching device 7 is device that matches sensor-side metadata with application-side metadata. The matching device 7 is provided with a sensor-side metadata acquiring unit 10, an application-side metadata acquiring unit 11, a matching unit 12, and a dataflow control command instructing unit 13.

The sensor-side metadata acquiring unit 10 acquires sensor-side test metadata from the sensor-side metadata database 5. Acquisition of sensor-side test metadata need only be triggered by event notification of the start of testing from the sensor-side or application-side, for example. Testing start event notification may involve the technician in charge of sensor installation verbally notifying the user who manages the matching device 7 or may involve an event notification signal being transmitted via a network. Furthermore, the sensor-side metadata acquiring unit 10 may be configured to acquire sensor-side test metadata periodically, regardless of testing start event notification.

Also, as another method, the start of testing or acquisition by the sensor-side metadata acquiring unit 10 may be triggered by the completion of writing of a sensor identifier (e.g., UUID) to sensor-side test metadata or application-side metadata described later.

Furthermore, as another method, a flag indicating whether retrieval is enabled or disabled may be provided in sensor-side test metadata, and the sensor-side metadata acquiring unit 10 may be configured to acquire sensor-side test metadata whose flag is on.

The application-side metadata acquiring unit 11 acquires application-side test metadata from the application-side metadata database 6. Acquisition of the application-side test metadata need only be triggered by testing start event notification from the sensor-side or application-side. Testing start event notification may involve the technician in charge of sensor installation verbally notifying the user who manages the matching device 7 or may involve an event notification signal being transmitted via a network. Furthermore, the application-side metadata acquiring unit 11 may be configured to acquire application-side test metadata periodically, regardless of testing start event notification.

Also, as another method, as described above, the start of testing and acquisition by the application-side metadata acquiring unit 11 may be triggered by completion of writing of a sensor identifier (e.g., UUID) to application-side metadata.

Furthermore, as another method, a flag indicating whether retrieval is enabled or disabled may be provided in application-side metadata, and the application-side metadata acquiring unit 11 may be configured to acquire application-side metadata whose flag is on.

The matching unit 12 performs matching with acquired sensor-side test metadata and application-side test metadata.

The objects to be matched are the sensor identifiers contained in the sensor-side test metadata and the application-side test metadata. In the case where the sensor identifier contained in the sensor-side test metadata coincides with the sensor identifier contained in the application-side test metadata, it is determined that the sensor-side test metadata and the application-side test metadata are matched. The result of the matching is then output to the dataflow control command instructing unit 13.

The dataflow control command instructing unit 13 transmits a dataflow control command to the data distribution device 4, in the case where a result indicating matched sensor identifiers is received from the matching unit 12. This dataflow control command includes information relating to the communication source (distribution source) of the sensing data of the sensors 1a to 1c that is contained in the sensor-side test metadata, and information relating to the communication destination (distribution destination) of the sensing data that is contained in the application-side test metadata. Note that, in the present example, information relating to the communication source (distribution source) is information relating to the sensor network adaptor 2, and information relating to the communication destination (distribution destination) is information relating to the application server 3.

Figure 4:
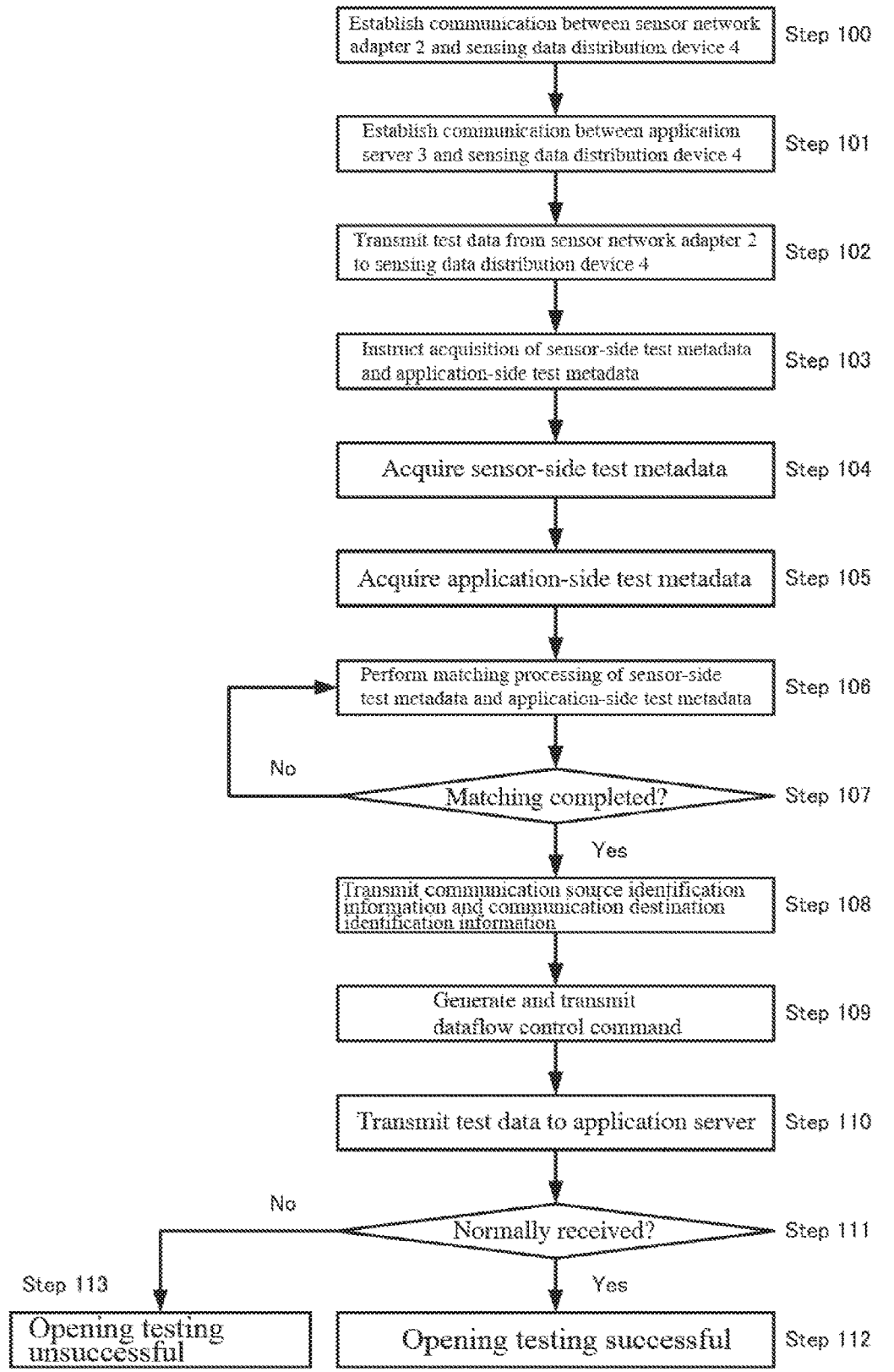
FIG. 4 is a flowchart of operations of the first embodiment.

Next, operations in the abovementioned configuration of the first embodiment will be described using the flowchart of FIG. 4. Note that, in the following description, the case where opening test with regard to the sensors 1a to 1c connected to the sensor network adaptor 2 will be described. Also, it is assumed that a sensor identifier is assigned to the sensor network adaptor 2 as representative of the sensors 1a to 1c. Also, the sensor identifier that is assigned is given as "a0eebc99ac0b4ef8bb6d6cb9bd380a11" generated using a conventional method of generating UUIDs.

First, sensor-side test metadata is created in the sensor opening test. Creation of sensor-side test metadata is, for example, carried out by the technician in charge of sensor installation prior to opening test. The created sensor-side test metadata is then registered into the sensor-side metadata database 5. An example of created sensor-side test metadata is shown in FIG. 5. The sensor-side test metadata shown in FIG. 5 consists of the items type, valid period, sensor identifier (UUID) and communication source identification information (communication source ID), with the type being "test mode", the valid period being "Until Aug. 9, 2016", the sensor identification information (UUID) being "a0eebc99ac0b4ef8bb6d6cb9bd380a11", and the communication former identification information (communication source ID) being "sensor network adaptor 2".

Note that, with sensor-side test metadata as shown in FIG. 5, the type item may be provided and the fact that the test mode is set may be indicated in this type item. This enables the sensor-side metadata acquiring unit 10, when acquiring sensor-side test metadata from the sensor-side metadata database 5, to acquire only sensor-side test metadata whose type item is "test mode", rather than acquiring a large amount of the sensor-side metadata that includes ordinary sensor-side metadata. In this way, as long as "test mode" metadata and "ordinary" metadata can be distinguished by type, the sensor-side metadata acquiring unit 10, when retrieving sensor-side test metadata, need only retrieve metadata whose type is "test mode", without needing to retrieve all of the sensor-side metadata, and thus the effect of reducing the processing time of the sensor-side metadata acquiring unit 10 is obtained.

Likewise, application-side test metadata is created. The creation of application-side test metadata is, for example, carried out by the technician in charge of sensor installation or the user of the application server 3 prior to opening test. The created application-side test metadata is then registered in the application-side metadata database 6. An example of application-side test metadata is shown in FIG. 6. The application-side test metadata shown in FIG. 6 consists of the items type, valid period, sensor identifier (UUID) and communication destination identification information (communication destination ID), with the type being "test mode", the valid period being "Until Aug. 9, 2016", the sensor identifier (UUID) being "a0eebc99ac0b4ef8bb6d6cb9bd380a11", and the communication destination identification information (communication destination ID) being "application server 3".

Note that, as shown in FIG. 6, the type item may be provided in the application-side test metadata, and the fact that the test mode is set may be indicated in this type item. This enables the application-side metadata acquiring unit 11, when acquiring application-side test metadata from the application-side metadata database 6, to acquire only application-side test metadata whose type item is "test mode", rather than acquiring a large amount of application-side metadata including ordinary application-side metadata. In this way, as long as "test mode" metadata and "ordinary" metadata can be distinguished by type, the application-side metadata acquiring unit 11, when retrieving application-side test metadata, need only retrieve metadata whose type is "test mode", without needing to retrieve all of the application-side metadata, and thus the effect of reducing the processing time of the application-side metadata acquiring unit 11 is obtained.

The sensor opening test can be started when registration of sensor-side test metadata and application-side test metadata has ended.

First, the sensor network adaptor 2 is transitioned to the test mode, and communication between the sensor network adaptor 2 and the sensing data distribution device 4 is established (Step 100). Establishment of communication between the sensor network adaptor 2 and the sensing data distribution device 4 is possible by these devices providing authentication information to each other. This authentication information is, for example, setting of a user ID and a password that is normally performed in order to ensure communication security. Communication is then established between the sensor network adaptor 2 and the sensing data distribution device 4, based on that authentication information.

Likewise, communication between the application server 3 and the sensing data distribution device 4 is established (Step 101). Establishment of communication between the application server 3 and the sensing data distribution device 4 is possible by these devices providing authentication information to each other. This authentication information is, for example, setting of a user ID and a password that is normally performed in order to secure communicative security. Communication is then established between the application server 3 and the sensing data distribution device 4, based on that authentication information.

The sensor opening test is started when establishment of communication between the sensor network adaptor 2, the sensing data distribution device 4 and the application server 3 is confirmed.

First, test data is continuously transmitted from the sensor network adaptor 2 to the sensing data distribution device 4 (Step 102). The test data that is transmitted is data including sensor recognition time and technician identification information that identifies the technician who carries out sensor installation.

Next, the sensor-side metadata acquiring unit 10 and the application-side metadata acquiring unit 11 are instructed to acquire sensor-side test metadata and application-side test metadata (Step 103).

The sensor-side metadata acquiring unit 10 acquires sensor-side test metadata whose type is "test mode" from the sensor-side metadata database 5, and outputs the acquired sensor-side test metadata to the matching unit 12 (Step 104).

The application-side metadata acquiring unit 11 acquires application-side test metadata whose type is "test mode" from the application-side metadata database 6, and outputs the acquired application-side test metadata to the matching unit 12 (Step 105).

The matching unit 12 performs matching with the acquired sensor-side test metadata and application-side test metadata (Step 106). The objects to be matched are the sensor identifiers contained in the sensor-side test metadata and the application-side test metadata. Here, sensor-side test metadata and application-side test metadata whose sensor identifier (UUID) is "a0eebc99ac0b4ef8bb6d6cb9bd380a11" are matched.

When matching is completed (Step 107), the matching unit 12 transmits information containing the communication source identification information (communication source ID) of the matched sensor-side test metadata, information containing the communication destination identification information (communication destination ID) of the matched application-side test metadata to the dataflow control command instructing unit 13 (Step 108). Here, the communication source identification information (communication source ID) that is transmitted to the dataflow control command instructing unit 13 is "sensor network adaptor 2". Also, the communication destination identification information (communication destination ID) that is transmitted to the dataflow control command instructing unit 13 is "application server 3".

The dataflow control command instructing unit 13 generates a dataflow control command that includes the communication source identification information (communication source ID) and communication destination identification information (communication destination ID) received from the matching unit 12, and transmits the generated dataflow control command to the sensing data distribution device 4 (Step 109). In the present example, the dataflow control command includes "sensor network adaptor 2" as the communication source identification information (communication source ID) and "application server 3" as the communication destination identification information (communication destination ID).

The sensing data distribution device 4 receives the dataflow control command, and transmits test data that is transmitted from the sensor network adaptor specified by the communication source identification information (communication source ID) that is included in the dataflow control command to the application server specified by the communication destination identification information (communication destination ID) included in the dataflow control command (Step 110). In the present example, test data that is transmitted from the sensor network adaptor 2 is distributed to the application server 3.

The application server 3 confirms whether the test data that is distributed from the sensing data distribution device 4 is correctly received (Step 111). If reception of test data can be confirmed, the sensor opening test was successful and is completed (Step 112). If reception of test data cannot be confirmed, the sensor opening test was unsuccessful (Step 113).

Note that, in the abovementioned operations, an example is shown in which an instruction to acquire sensor-side test metadata and application-side test metadata is given to the sensor-side metadata acquiring unit 10 and the application-side metadata acquiring unit 11, but an instruction need not be given in the case where the sensor-side metadata acquiring unit 10 and the application-side metadata acquiring unit 11 are configured to acquire test metadata periodically.

Also, although the description of the abovementioned operations gives an example (Step 102) in which test data is continuously transmitted from the sensor network adaptor 2 to the sensing data distribution device 4 prior to matching processing, the present invention is not limited thereto. For example, a configuration may be adopted in which matching processing of the sensor-side test metadata and the application-side test metadata is performed first, and after matching is completed (Step 107) and the dataflow control command instructing unit 13 has transmitted a dataflow control command to the sensing data distribution device 4 (Step 109), test data is transmitted from the sensor network adaptor 2 to the sensing data distribution device 4 (Step 102).

Furthermore, the abovementioned start of matching and transmission of sensing data are merely intended as examples, and the present invention is not limited to this embodiment.

According to the first embodiment, matching processing is performed at high speed by limiting the target of matching of the sensor-side metadata and the application-side metadata to the sensor identifier, enabling fast opening test to be implemented. As a result, the resources of the processor that are required in matching processing takes can be reduced.

Also, according to the first embodiment, by limiting the target of matching of the sensor-side metadata and the application-side metadata to the sensor identifier, failed installation of the new sensor and failed matching of metadata can be distinguished in the case where opening confirmation testing of a newly installed sensor fails, enabling an increase in the efficiency of opening test to be attained. Thus, the amount of communication for cause investigation and the like can be reduced, and the use of communication resources can be reduced as a result.

Second Embodiment

In the first embodiment described above, an example was described in which the matching device is instructed to start opening test verbally or with an instruction signal, but it is more convenient if the technician in charge of sensor installation is able to control the start of opening test and is further able to check the state of the opening test from the site where a sensor is newly installed. In view of this, a second embodiment describes an example in which the technician in charge is able to use an opening test management terminal to confirm the start and completion of opening test.

Figure 7:
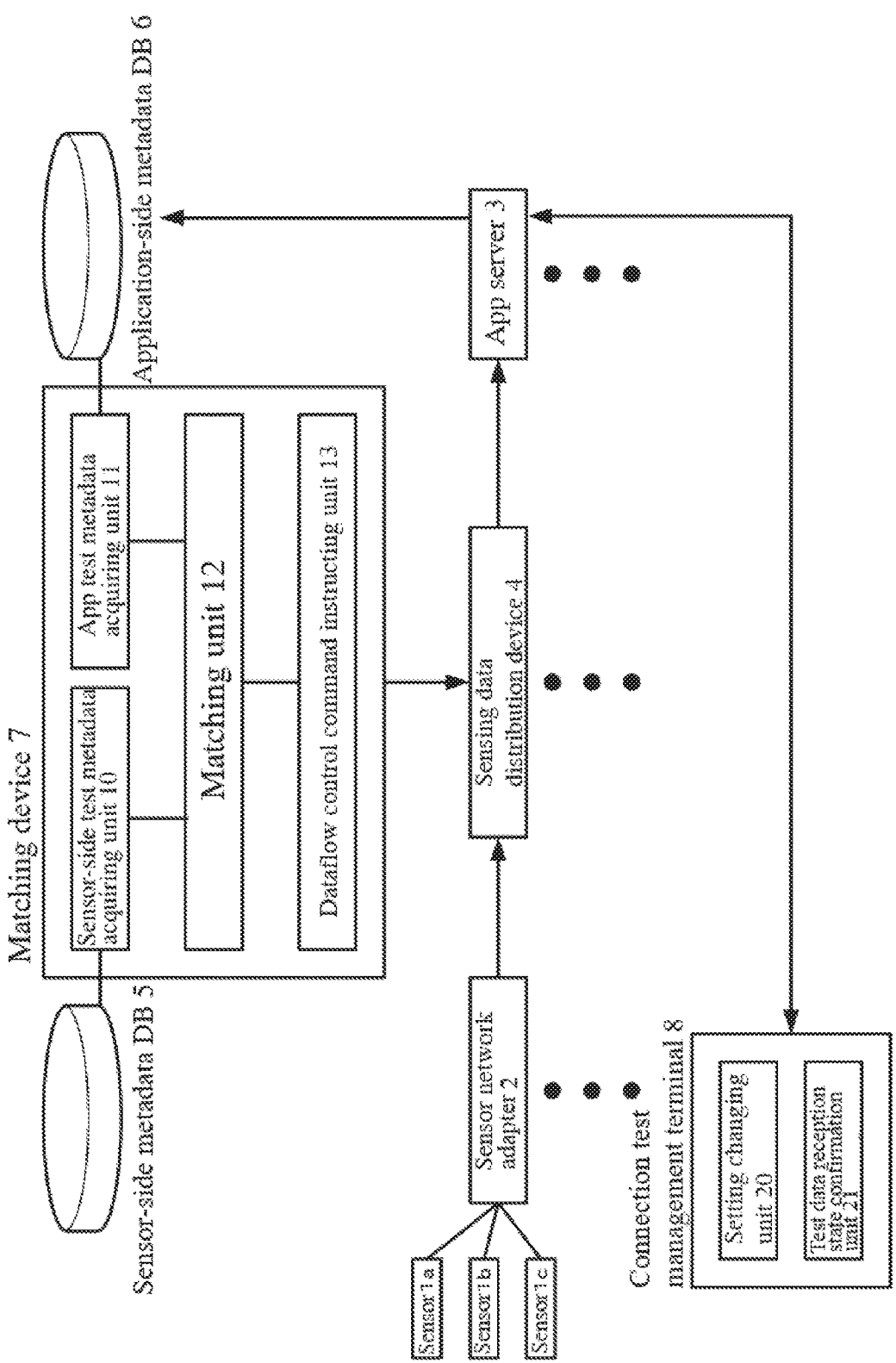
FIG. 7 is a block diagram of a second embodiment.

FIG. 7 is a block diagram of the second embodiment.

The second embodiment is provided with an opening test management terminal 8, in addition to the first embodiment.

Furthermore, an item indicating whether the application-side metadata acquiring unit 11 capable of retrieval (acquisition) is added to the application-side test metadata described in the first embodiment. FIG. 8 is a diagram showing an example of application-side test metadata in the second embodiment. In the example of FIG. 8, the retrieval availability item indicating whether the application-side metadata acquiring unit 11 is capable of retrieval (acquisition) has been added the application-side test metadata, and that item is "disabled". In the case where the retrieval availability item is "disabled", the application-side metadata acquiring unit 11 is configured to then remove that application-side test metadata from being a retrieval (acquisition) target.

The opening test management terminal 8 has a function of accessing the application server 3 via communication. The opening test management terminal 8 has a setting changing unit 20 that is able to change the setting of the item indicating the retrieval availability of application-side test metadata stored in the application-side metadata database 6 to "enabled" via the application server 3.

Furthermore, the opening test management terminal 8 has a test data reception state confirmation unit 21 that is able to confirm the reception state, in the application server 3, of test data that is distributed from the sensing data distribution device 4. The technician-in-charge is then able to use the test data reception state confirmation unit 21 to check whether the application server 3 is correctly receiving the test data that is distributed from the sensing data distribution device 4. Note that methods of presenting the reception state of test data include using a display screen to display the contents that are included in the test data and displaying an indication that test data was received normally.

Figure 9:
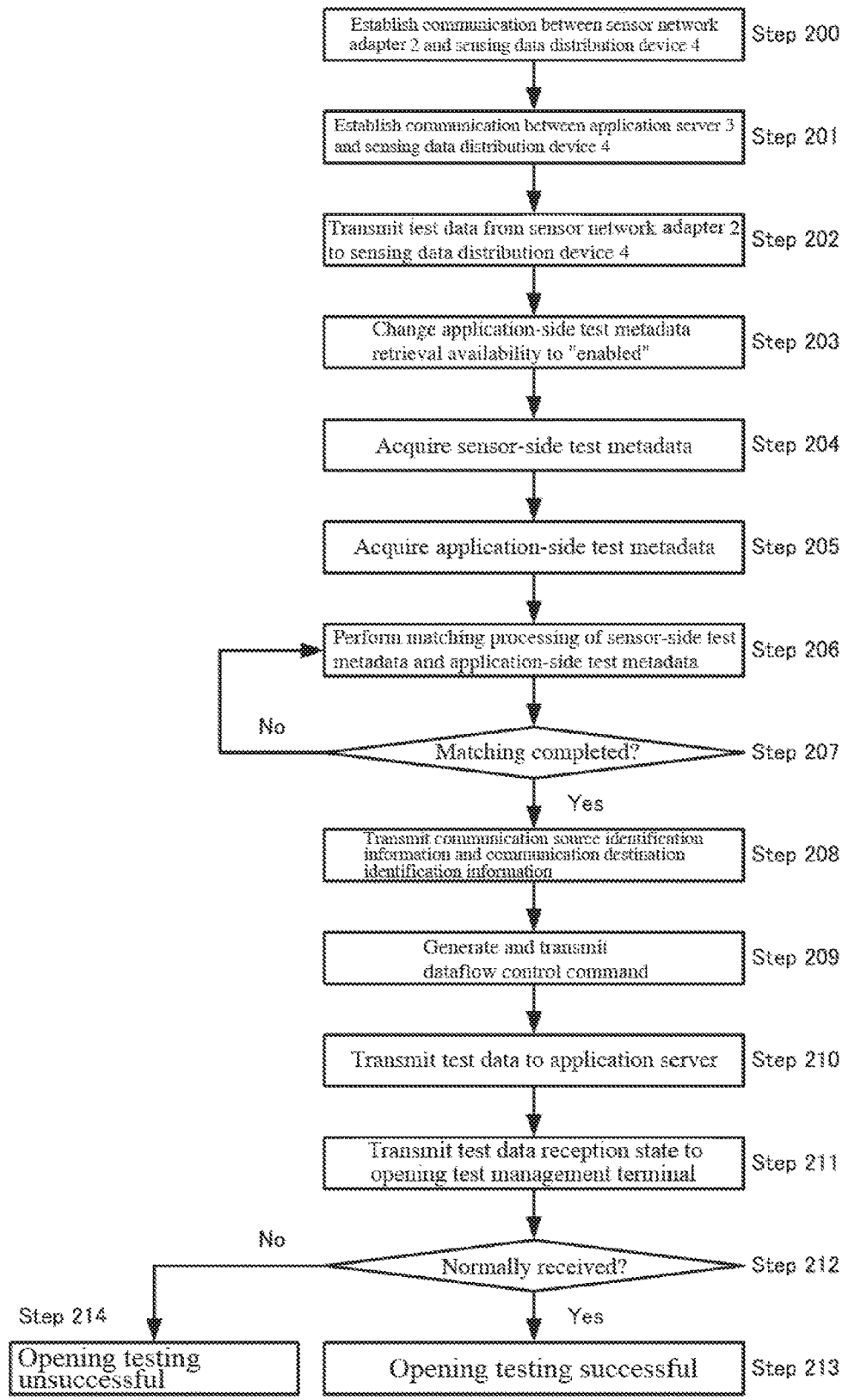
FIG. 9 is a flowchart of operations of the second embodiment.

Next, operations of the second embodiment in above-mentioned configuration will be described using the flowchart of FIG. 9. Note that, in the following description, the case where opening test is performed with regard to the sensors 1a to 1c connected to the sensor network adaptor 2 will be described. Also, it is assumed that a sensor identifier is assigned to the sensor network adaptor 2 as representative of the sensors 1a to 1c. Also, the sensor identifier that is assigned is given as "a0eebc99ac0b4ef8bb6d6cb9bd380a11" generated using a conventional method of generating UUIDs.

Also, in the second embodiment, unlike the first embodiment, the sensor-side metadata acquiring unit 10 and the application-side metadata acquiring unit 11 are configured to acquire test metadata periodically.

First, the sensor-side test metadata is created in the sensor opening test. Creation of sensor-side test metadata is, for example, carried out by the technician in charge of sensor installation prior to opening test. The created sensor-side test metadata is then registered in the sensor-side metadata database 5. An example of sensor-side test metadata is similar to FIG. 5 described above.

Application-side test metadata is created. Creation of the application-side test metadata is, for example, carried out by the technician in charge of sensor installation or the user of the application server 3 prior to opening test. In the second embodiment, as shown in FIG. 8, an application-side test metadata retrieval availability item has been added. When registering in the application-side metadata database 6, the retrieval availability item is set to "disabled". The other items are similar to the first embodiment.

Sensor opening test can be started when registration of the sensor-side test metadata and the application-side test metadata is completed.

First, the sensor network adaptor 2 is transitioned to the test mode, and communication between the sensor network adaptor 2 and the sensing data distribution device 4 is established (Step 200). Establishment of communication between the sensor network adaptor 2 and the sensing data distribution device 4 is possible by these devices providing authentication information to each other. This authentication information is, for example, setting of a user ID and a password that is normally performed in order to ensure communication security. Communication is then established between the sensor network adaptor 2 and the sensing data distribution device 4, based on that authentication information.

Likewise, communication between the application server 3 and the sensing data distribution device 4 is established (Step 201). Establishment of communication between the application server 3 and the sensing data distribution device 4 is possible by these devices providing authentication information to each other. This authentication information is, for example, setting of a user ID and a password that is normally performed in order to ensure communication security. Communication is then established between the application server 3 and the sensing data distribution device 4, based on that authentication information.

The sensor opening test is started when establishment of communication between the sensor network adaptor 2, the sensing data distribution device 4 and the application server 3 is confirmed.

First, test data is continuously transmitted from the sensor network adaptor 2 to the sensing data distribution device 4 (Step 202). The test data that is transmitted is data including sensor recognition time and technician identification information that identifies the technician who carries out sensor installation. To this point, the processing is similar to the first embodiment.

Next, the technician in charge accesses the application server 3 using the opening test management terminal 8, and changes the setting of the application-side test metadata retrieval availability item that is stored in the application-side metadata database 6 to "enabled" via the application server 3 (Step 203). FIG. 10 is a diagram showing an example in which the setting of the application-side test metadata retrieval availability item has been changed to "enabled" using the opening test management terminal 8.

The sensor-side metadata acquiring unit 10 periodically acquires sensor-side test metadata whose type is "test mode" from the sensor-side metadata database 5, and outputs the acquired sensor-side test metadata to the matching unit 12 (Step 204).

The application-side metadata acquiring unit 11 periodically acquires application-side test metadata whose type is "test mode" and whose retrieval availability item is "enabled" from the application-side metadata database 6, and outputs the acquired application-side test metadata to the matching unit 12 (Step 205).

The matching unit 12 performs matching with the acquired sensor-side test metadata and application-side test metadata (Step 206). The objects to be matched are the sensor identifiers contained in the sensor-side test metadata and the application-side test metadata. Here, sensor-side test metadata and application-side test metadata whose sensor identifier (UUID) is "a0eebc99ac0b4ef8bb6d6cb9bd380a11" are matched.

When matching is completed (Step 207), the matching unit 12 transmits information containing the communication source identification information (communication source ID) of the matched sensor-side test metadata and information containing the communication destination identification information (communication destination ID) of the matched application-side test metadata to the dataflow control command instructing unit 13 (Step 208). Here, the communication source identification information (communication source ID) that is transmitted to the dataflow control command instructing unit 13 is "sensor network adaptor 2".

Also, the communication destination identification information (communication destination ID) that is transmitted to the dataflow control command instructing unit 13 is "application server 3".

The dataflow control command instructing unit 13 generates a dataflow control command that includes the communication source identification information (communication source ID) and communication destination identification information (communication destination ID) received from the matching unit 12, and transmits the generated dataflow control command to the sensing data distribution device 4 (Step 209). In the present example, the dataflow control command includes "sensor network adaptor 2" as the communication source identification information (communication source ID) and "application server 3" as communication destination identification information (communication destination ID).

The sensing data distribution device 4 receives the dataflow control command, and transmits test data that is transmitted from the sensor network adaptor specified by the communication source identification information (communication source ID) that is included in the dataflow control command to the application server specified by the communication destination identification information (communication destination ID) included in the dataflow control command (Step 210). In the present example, test data that is transmitted from the sensor network adaptor 2 is distributed to the application server 3.

The application server 3 transmits the reception state of the test data that is distributed from the sensing data distribution device 4 to the opening test management terminal 8 (Step 211).

The technician in charge checks the reception state of the test data of the application server 3 using the opening test management terminal 8 (Step 212). If normal reception of test data can be confirmed, the sensor opening test was successful and is completed (Step 213). If normal reception of test data cannot be confirmed, the sensor opening test was unsuccessful (Step 213).

Note that although the second embodiment describes an example in which an item indicating whether the application-side metadata acquiring unit 11 is capable of retrieval (acquisition) is added to the application-side test metadata, it is also possible to add an item indicating whether the sensor-side metadata acquiring unit 10 is capable of retrieval (acquisition) to the sensor-side test metadata. In this case, the opening test management terminal 8 need only be configured to access the sensor-side metadata database 5 and change the sensor-side test metadata retrieval availability item to "enabled".

Furthermore, a configuration may be adopted in which the retrieval availability of the sensor-side test metadata or the application-side test metadata can be distinguished by another method, without adding a retrieval availability item to the sensor-side test metadata or the application-side test metadata. For example, a configuration may be adopted in which the sensor identifier (UUID) is set to zero at the time of registering sensor-side test metadata or application-side test metadata, and, at the time of executing opening test, the retrieval availability of sensor-side test metadata or application-side test metadata can be distinguished by rewriting the sensor identifier (UUID) from zero through the opening test management terminal 8 or the like to information that is uniquely identifiable. In this case, the sensor-side metadata acquiring unit 10 or the application-side metadata acquiring unit 11 need only be configured to not target sensor-side test metadata or application-side test metadata whose sensor identifier (UUID) is zero for retrieval (acquisition).

Also, although the description of the abovementioned operations gives an example (Step 202) in which test data is continuously transmitted from the sensor network adaptor 2 to the sensing data distribution device 4 prior to matching processing, the present invention is not limited thereto. For example, a configuration may be adopted in which matching processing of the sensor-side test metadata and the application-side test metadata is performed first, and after matching is completed (Step 207) and the dataflow control command instructing unit 13 has transmitted a dataflow control command to the sensing data distribution device 4 (Step 209), test data is transmitted from the sensor network adaptor 2 to the sensing data distribution device 4 (Step 202).

Also, the opening test management terminal 8 may be provided with an E-mail transmission/reception function to enable the opening test state to be reported to an installation supervisor.

According to the configuration of the second embodiment, the technician in charge of sensor installation is able to control the start of opening test and is further to check the state of opening test.

Third Embodiment

A third embodiment describes an example in which the sensor performs opening test autonomously.

Figure 11:
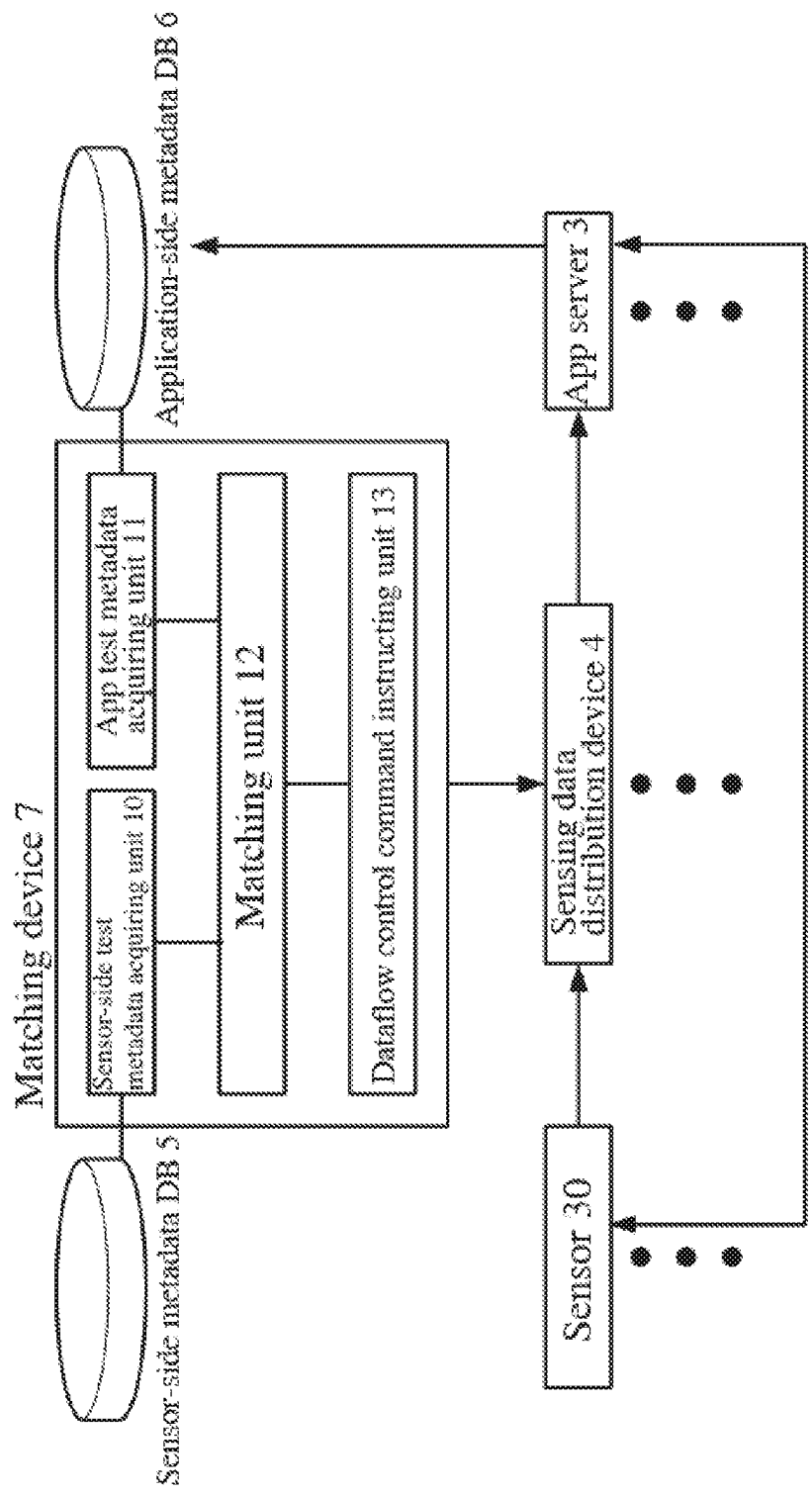
FIG. 11 is a block diagram of a third embodiment.

FIG. 11 is a block diagram of the third embodiment.

The third embodiment is constituted by a sensor 30 in which the sensors 1*a* to 1*c* of the first embodiment and the second embodiment are integrally formed with the sensor network adaptor 2.

Figure 12:
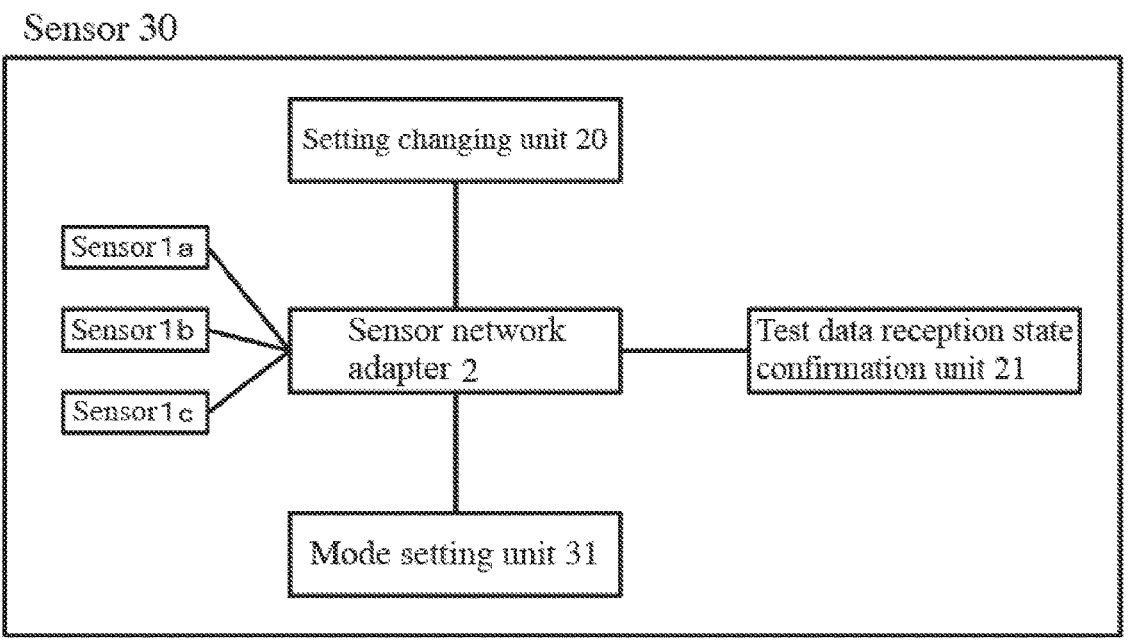
FIG. 12 is a block diagram of a sensor 30.

FIG. 12 is a block diagram of the sensor 30. Note that the same mark is attached about the thing of the same configuration as the first and the second embodiments.

The sensor 30 is provided with the sensors 1*a* to 1*c* and the sensor network adaptor 2.

Furthermore, the sensor 30 is provided with a mode setting unit 31 that sets a normal mode for transmitting the sensing data of the sensors 1*a* to 1*c* to the sensor network adaptor 2 and a test mode for transmitting test data to the sensor network adaptor 2. In the case where the test mode is set by the mode setting unit 31, the sensor 30 transmits test data. Test data, as described above, may be any data that is known to be test data, examples of which include sensor recognition time and technician identification information that identifies the technician who carries out sensor installation.

Furthermore, the sensor 30 has a setting changing unit 20 that has a function of accessing the application server 3 via communication, as described in the second embodiment, when in the test mode, and is able to change the setting of the item indicating the retrieval availability of application-side test metadata stored in the application-side metadata database 6 to "enabled" via the application server 3.

Furthermore, the sensor 30 has a test data reception state confirmation unit 21 that, as described in the second embodiment, is able receive, from the application server 3, the reception state of test data that is distributed from the sensing data distribution device 4, and conform whether the test data is being correctly received. The reception state can, for example, be confirmed by the test data reception state checking unit 21 using a light emitter that emits solid light if data was received normally and emits flashing light if data was not received normally.

Figure 13:
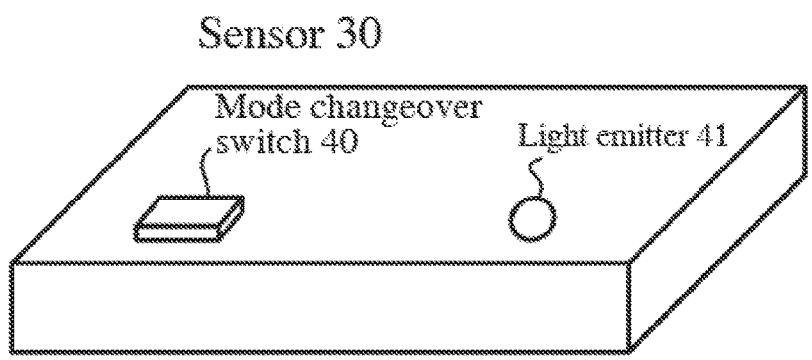
FIG. 13 is a schematic view of the sensor 30 in the third embodiment.

FIG. 13 is a schematic view of the sensor 30 in the third embodiment. The sensor 30 in FIG. 13 is provided with a mode changeover switch 40 and a light emitter 41 on the sensor case. Switching between the normal mode and the test mode is performed using the mode changeover switch 40. Also, the light emitter 41 is a light emitter such as an LED, and emits solid light if test data is received normally, and emits flashing light if test data is not received normally.

Figure 14:
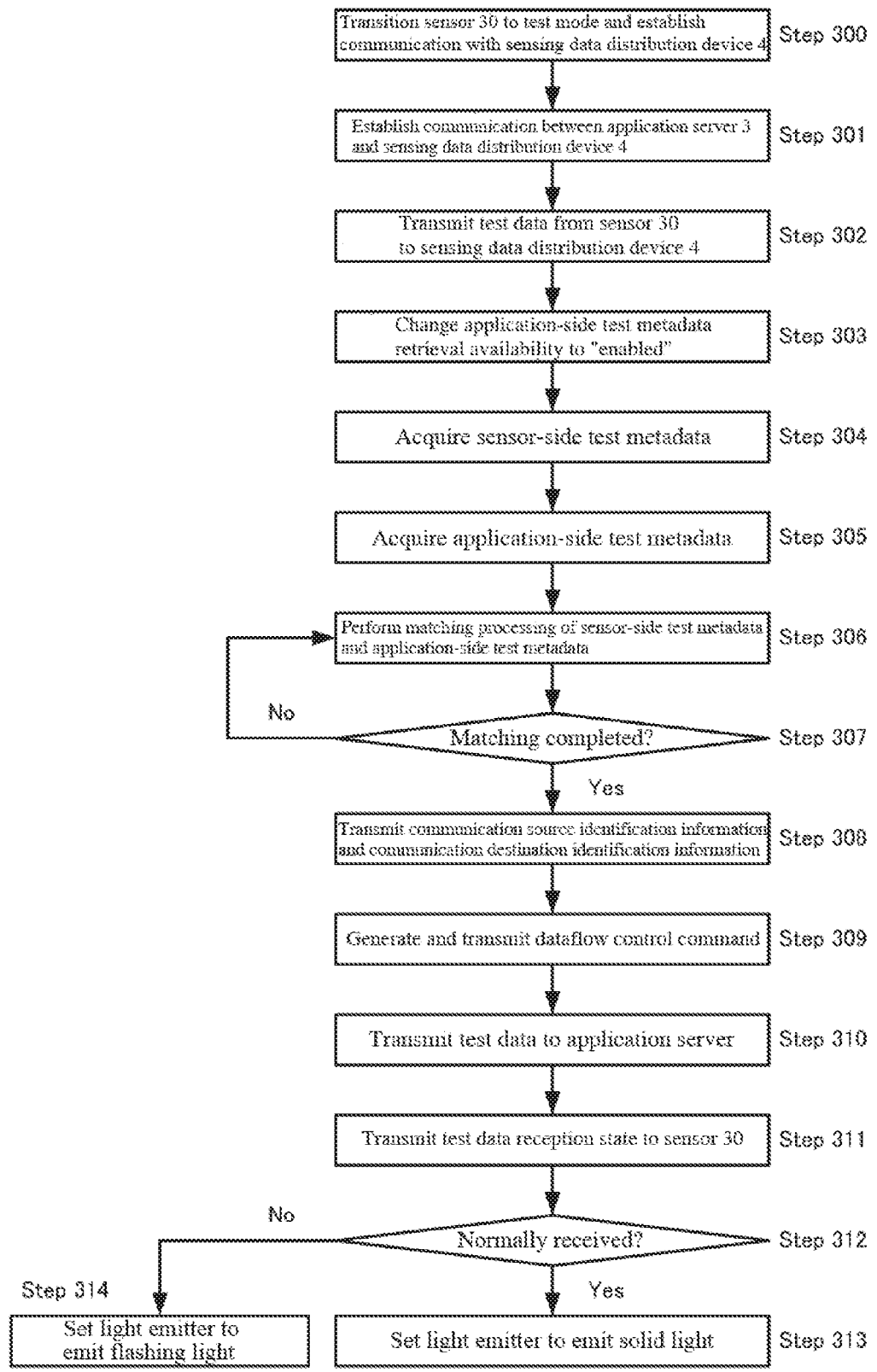
FIG. 14 is a flowchart of operations of the third embodiment.

Next, operations of the third embodiment in above-mentioned configuration will be described using the flowchart of FIG. 14. Note that, in the following description, the sensor identifier of the sensor 30 is given as "a0eebc99ac0b4ef8bb6d6cb9bd380a11" generated using a conventional method of generating UUIDs. Note that there are also cases where it is desired to collectively manage the sensors 1a to 1c due to a request from the application side, in which case a sensor identifier may be assigned to the sensor network adaptor 2 as representative of the sensors 1a to 1c.

Also, it is assumed that the sensor-side metadata acquiring unit 10 and the application-side metadata acquiring unit 11 are configured to acquire test metadata periodically.

First, sensor-side test metadata is created in the sensor opening test. Creation of sensor-side test metadata is, for example, carried out by the technician in charge of sensor installation prior to opening test. The created sensor-side test metadata is then registered in the sensor-side metadata database 5. An example of sensor-side test metadata is similar to FIG. 5 described above.

Application-side test metadata is created. Creation of the application-side test metadata is, for example, carried out by the technician in charge of sensor installation or the user of the application server 3 prior to opening test. In the third embodiment, as shown in FIG. 8, an application-side test metadata retrieval availability item has been added. When registering in the application-side metadata database 6, the retrieval availability item is set to "disabled". The other items are similar to the first and second embodiments.

Sensor opening test can be started when registration of the sensor-side test metadata and the application-side test metadata is completed.

First, when the technician in charge switches to the test mode using the mode changeover switch 40, the mode setting unit 31 transitions the sensor 30 to the test mode, and communication is established between the sensor 30 and the sensing data distribution device 4 (Step 300). Establishment of communication between the sensor 30 and the sensing data distribution device 4 is possible by these devices providing authentication information to each other. This authentication information is, for example, setting of a user ID and a password that is normally performed in order to ensure communication security. Communication is then established between the sensor 30 and the sensing data distribution device 4, based on that authentication information.

Likewise, communication between the application server 3 and the sensing data distribution device 4 is established (Step 301). Establishment of communication between the application server 3 and the sensing data distribution device 4 is possible by these devices providing authentication information to each other. This authentication information is, for example, setting of a user ID and a password that is normally performed in order to ensure communication security. Opening of communication is then established between the application server 3 and the sensing data distribution device 4, based on that authentication information.

The sensor opening test is started when establishment of communication between the sensor network adaptor 2, the sensing data distribution device 4 and the application server 3 is confirmed.

The sensor 30 continuously transmits test data to the sensing data distribution device 4 (Step 302). The test data that is transmitted is data including sensor recognition time and technician identification information that identifies the technician who carries out sensor installation.

Next, the setting changing unit 20 of the sensor 30 accesses the application server 3, and changes the setting of the application-side test metadata retrieval availability item that is stored in the application-side metadata database 6 to "enabled" via the application server 3 (Step 303).

The sensor-side metadata acquiring unit 10 periodically acquires sensor-side test metadata whose type is "test mode" from the sensor-side metadata database 5, and outputs the acquired sensor-side test metadata to the matching unit 12 (Step 304).

The application-side metadata acquiring unit 11 periodically acquires application-side test metadata whose type is "test mode" and whose retrieval availability item is "enabled" from the application-side metadata database 6, and outputs the acquired application-side test metadata to the matching unit 12 (Step 305).

The matching unit 12 performs matching of the acquired sensor-side test metadata and application-side test metadata (Step 306). The target of the matching is the sensor identifier contained in the sensor-side test metadata and the application-side test metadata. Here, sensor-side test metadata and application-side test metadata whose sensor identifier (UUID) is "a0eebc99ac0b4ef8bb6d6cb9bd380a11" are matched.

When matching is completed (Step 307), the matching unit 12 transmits information containing the communication source identification information (communication source ID) of the matched sensor-side test metadata and information containing the communication destination identification information (communication destination ID) of the matched application-side test metadata to the dataflow control command instructing unit 13 (Step 308). Here, the communication source identification information (communication source ID) that is transmitted to the dataflow control command instructing unit 13 is "sensor network adaptor 2 (=sensor 30)". Also, the communication destination identification information (communication destination ID) that is transmitted to the dataflow control command instructing unit 13 is "application server 3".

The dataflow control command instructing unit 13 generates a dataflow control command that includes the communication source identification information (communication source ID) and communication destination identification information (communication destination ID) received from the matching unit 12, and transmits the generated dataflow control command to the sensing data distribution device 4 (Step 309). In the present example, the dataflow control command includes "sensor network adaptor 2 (=sensor 30)" as the communication source identification information (communication source ID) and "application server 3" as communication destination identification information (communication destination ID).

The sensing data distribution device 4 receives the dataflow control command, and transmits test data that is transmitted from the sensor network adaptor specified by the communication source identification information (communication source ID) that is included in the dataflow control command to the application server 3 specified by the communication destination identification information (communication destination ID) included in the dataflow control command (Step 310). In the present example, test data from the sensor network adaptor 2, that is, the sensor 30, is distributed to the application server 3.

The application server 3 transmits the reception result of the test data that is distributed from the sensing data distribution device 4 to the sensor 30 (Step 311).

The sensor 30 receives the reception result of the test data (Step 312). If the reception result is that data was received normally, the light emitter is set to emit solid light by the test data reception state confirmation unit 21 (Step 313). If reception of test data cannot be confirmed, the light emitter is set to emit flashing light by the test data reception state confirmation unit 21 (Step 313).

Note that although the third embodiment describes an example in which the setting of the application-side test metadata retrieval availability item is changed, similarly to the second embodiment, a configuration may be adopted in which an item indicating whether the sensor-side metadata acquiring unit 10 is capable of retrieval (acquisition) is added to the sensor-side test metadata and the sensor-side metadata database 5 can be accessed to change the sensor-side test metadata retrieval availability item to "enabled".

Furthermore, similarly to the second embodiment, a configuration may be adopted in which the retrieval availability of sensor-side test metadata or application-side test metadata can be distinguished by another method, without adding a retrieval availability item to the sensor-side test metadata or the application-side test metadata. For example, a configuration may be adopted in which the sensor identifier (UUID) is set to zero at the time of registering sensor-side test metadata or application-side test metadata, and, at the time of executing opening test, the retrieval availability of sensor-side test metadata or application-side test metadata can be distinguished by rewriting the sensor identifier (UUID) from zero through the sensor 30 to information that is uniquely identifiable. In this case, the sensor-side metadata acquiring unit 10 or the application-side metadata acquiring unit 11 need only be configured to not target sensor-side test metadata or application-side test metadata whose sensor identifier (UUID) is zero for retrieval (acquisition).

Also, although the description of the abovementioned operations gives an example (Step 302) in which test data is continuously transmitted from the sensor network adaptor 2 to the sensing data distribution device 4 prior to matching processing, the present invention is not limited thereto. For example, a configuration may be adopted in which matching processing of the sensor-side test metadata and the application-side test metadata is performed first, and after matching is completed (Step 307) and the dataflow control command instructing unit 13 has transmitted a dataflow control command to the sensing data distribution device 4 (Step 309), test data is transmitted from the sensor network adaptor 2 to the sensing data distribution device 4 (Step 302).

Also, although the third embodiment describes an example in which the sensor 30 is provided with a setting changing unit 20 that enables metadata to be retrieved, the setting changing unit 20 is not necessarily required. In this case, similarly to the first embodiment, a configuration may be adopted in which the start of opening test is communicated and sensor-side test metadata or application-side test metadata is set to be acquirable to enable matching of metadata to be performed.

According to the third embodiment, a configuration is adopted in which the sensor can perform opening test autonomously, thus enabling the technician in charge of sensor installation to carry out sensor opening test without preparing any special equipment.

Variations of Third Embodiment

Figure 15:
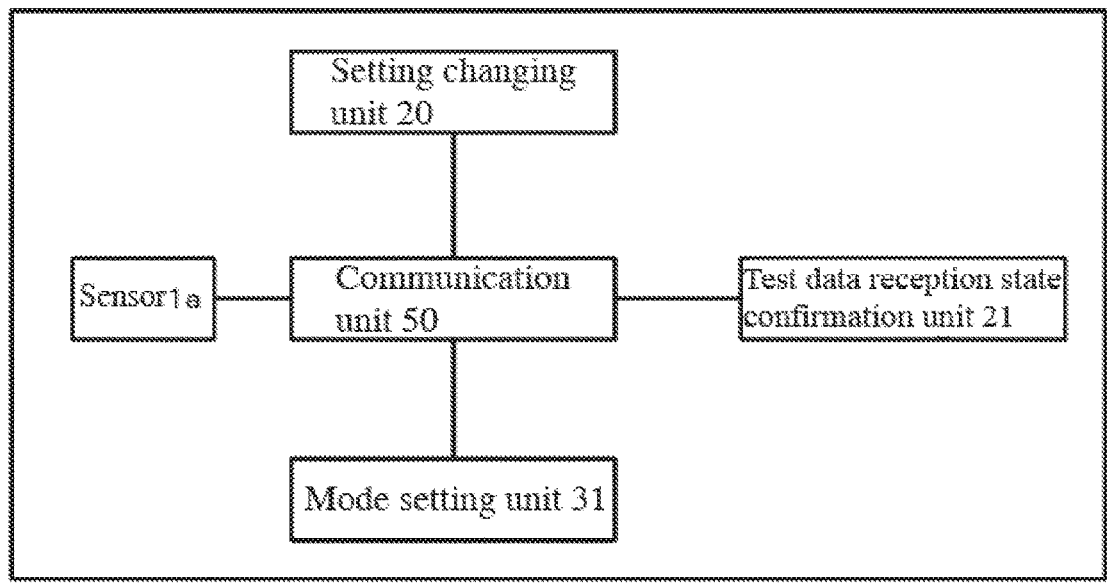
FIG. 15 is a schematic view of the sensor 30 in a variation of the third embodiment.

FIG. 15 is a block diagram of the sensor 30 in a variation of the third embodiment.

The abovementioned third embodiment described an example in which the sensor 30 is provided with the sensors 1a to 1c and the sensor network adaptor 2. However, the sensor 30 need not be provided with three sensors 1a to 1c, and may be provided with one sensor 1a. In this case, the sensor 30 need not be provided with the network adaptor 2, and may be provided with a communication unit 50 that is able to transmit and receive test data and sensing data of the sensor 1a and various other types of data and the like to and from the sensing data distribution device 4, the matching device 7 and the application server 3 via a network. The remaining configuration is similar to the abovementioned third embodiment. Note that, in the present example, the sensor identifier is assigned to the sensor 1a.

Figure 16:
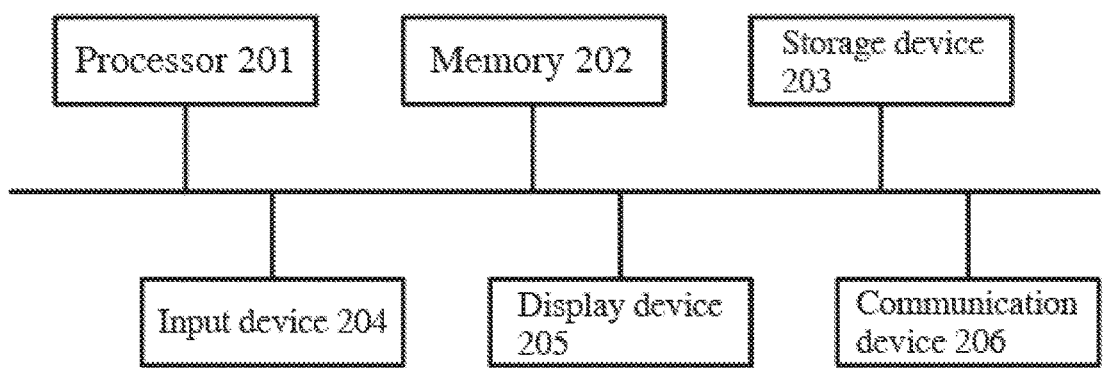
FIG. 16 is another configuration diagram of the third embodiment.

Note that the matching device 7 can, as shown in FIG. 16, be constituted by a general-purpose computer having hardware resources such as a processor 201, a memory (ROM, RAM) 202, a memory storage (hard disk, semiconductor disk. etc) 203, an input device 204 (keyboard, mouse, touch panel, etc.), a display device 205 and a communication unit 206, for example. The functions of the matching device 7 are realized, by a computer program stored in the memory storage 203 being loaded to the memory 202 and executed by the processor 201. Note that the matching device 7 may be constituted by one computer, or may be constituted by distributed computing by a plurality computers. It is also possible to realize some or all of the functions of the matching device 1 using dedicated hardware (e.g., GPU, FPGA, ASIC, etc.) in order to speed up processing.

Furthermore, the abovementioned functions of the opening test management terminal 8 and the sensor 30 can similarly be realized a computer that has hardware resources.

Also, some or all of the above embodiments can also be described as in the following supplementary remarks, but are not limited to the following.

Supplementary Remark 1

A sensor opening test device comprising at least one hardware processor, the hardware processor:

acquiring sensor-side test metadata that is for use in opening testing and includes at least a sensor identifier uniquely identifying a sensor configured to output sensing data or a network adaptor connected to the sensor and configured to transmit sensing data to a network, acquiring application-side test metadata that is metadata of an opening test application for use in opening testing of the sensor and includes at least the sensor identifier, determining matching of the acquired sensor-side test metadata and the acquired application-side test metadata, based on a sameness of the sensor identifiers, and transmitting, to a distribution device configured to manage distribution of the sensing data, a dataflow control command instructing test data flow to the opening test application from the sensor or network adaptor specified by the sensor-side test metadata and the application-side test metadata that are matched.

Supplementary Remark 2

A sensor opening test management terminal in a sensor opening test system that, with respect to sensor-side test metadata that is for use in opening testing and includes at least a sensor identifier uniquely identifying a sensor configured to output sensing data or a network adaptor connected to the sensor and configured to transmit sensing data to a network and application-side test metadata that is metadata of an opening test application for use in opening testing of the sensor and includes at least the sensor identifier, determines matching of the sensor-side test metadata and the application-side test metadata, based on a sameness of the sensor identifiers, and performs opening testing of the sensor or the network adaptor, the sensor opening test management terminal including:

at least one hardware processor, the processor:

changing a setting of the sensor-side test metadata or the application-side test metadata, such that the sensor-side test metadata or the application-side test metadata is targeted for matching, and presenting a reception state, in the opening test application, of test data transmitted from the sensor or network adaptor.

Supplementary Remark 3

A sensor in a sensor opening test system that, with respect to sensor-side test metadata that is for use in opening testing and includes at least a sensor identifier uniquely identifying a sensor configured to output sensing data and application-side test metadata that is metadata of an opening test application for use in opening testing of the sensor and includes at least the sensor identifier, determines matching of the sensor-side test metadata and the application-side test metadata, based on a sameness of the sensor identifiers, and performs opening testing of the sensor, the sensor including:

a sensor configured to output sensing data; and at least one hardware processor, wherein the processor:

transmitting the sensing data when in a normal mode, transmitting test data when in a sensor opening test mode, and presenting a reception state, in the opening test application, of test data transmitted from the sensor.

Supplementary Remark 4

A sensor opening test method according to which a computer:

acquires sensor-side test metadata that is for use in opening testing and includes at least a sensor identifier uniquely identifying a sensor configured to output sensing data or a network adaptor connected to the sensor and configured to transmit sensing data to a network;

acquires application-side test metadata that is metadata of an opening test application for use in opening testing of the sensor and includes at least the sensor identifier;

determines matching of the acquired sensor-side test metadata and the acquired application-side test metadata, based on a sameness of the sensor identifiers; and instructs, to a distribution device configured to manage distribution of the sensing data, test data flow to the opening test application from the sensor or network adaptor specified by the sensor-side test metadata and the application-side test metadata that are matched.

Supplementary Remark 5

A recording medium on which is recorded a computer program for causing a computer to execute:

processing for acquiring sensor-side test metadata that is for use in opening testing and includes at least a sensor identifier uniquely identifying a sensor configured to output sensing data or a network adaptor connected to the sensor and configured to transmit sensing data to a network;

processing for acquiring application-side test metadata that is metadata of an opening test application for use in opening testing of the sensor and includes at least the sensor identifier;

processing for determining matching of the acquired sensor-side test metadata and the acquired application-side test metadata, based on a sameness of the sensor identifiers; and processing for transmitting, to a distribution device configured to manage distribution of the sensing data, a dataflow control command instructing test data flow to the opening test application from the sensor or network adaptor specified by the sensor-side test metadata and the application-side test metadata that are matched.

Although the present invention was described above giving preferred embodiments and application examples, the configurations of all of the embodiments or application examples need not be provided, and not only can the embodiments and application examples be combined and implemented as appropriate but the present invention is not necessarily limited to the above embodiments and application examples, and various changes can be made within the scope of the technical idea of the invention and implemented.

INDEX TO THE REFERENCE NUMERALS 1a-1c Sensor
2 Sensor network adaptor
3 Application server
4 Sensing data distribution device
5 Sensor-side metadata database
6 Application-side metadata database
7 Matching device
8 Opening test management terminal
Sensor-side metadata acquiring unit
11 Application-side metadata acquiring unit
12 Matching unit
13 Dataflow control command instructing unit
20 Setting changing unit
21 Test data reception state confirmation unit
30 Sensor
40 Mode changeover switch
41 Light emitter
50 Communication unit
31 Mode setting unit
201 Processor
202 Memory
203 Storage device
204 Input device
205 Display device
206 Communication device

The invention claimed is:

1. A sensor opening test system comprising a processor configured with a program to perform operations comprising:

operation as a sensor-side metadata acquiring unit configured to acquire sensor-side test metadata for opening testing only, the sensor-side test metadata including at least a sensor identifier uniquely identifying a sensor configured to output sensing data or a network adaptor connected to the sensor and configured to transmit sensing data to a network;

operation as an application-side metadata acquiring unit configured to acquire application-side test metadata for the opening testing only, the application-side test metadata comprising metadata of an opening test application for the opening testing of the sensor only, the metadata of the opening test application including at least the sensor identifier, the opening test application being configured to check whether or not an application device in which the opening test application is installed can receive data from the sensor;

operation as a matching unit configured to determine matching of the acquired sensor-side test metadata and the acquired application-side test metadata, based on a sameness of the sensor identifiers; and operation as an instructing unit configured to transmit, to a distribution device configured to manage distribution of the sensing data, a dataflow control command instructing test data flow to the opening test application of the application device from the sensor or network adaptor specified by the sensor-side test metadata and the application-side test metadata that are matched.

2. The sensor opening test system according to claim 1, wherein the sensor-side test metadata includes information indicating that the metadata comprises metadata for the opening testing, and information identifying a distribution source of sensing data of the sensor, and the application-side test metadata includes information indicating that the metadata comprises metadata for the opening testing, and information identifying a distribution destination of sensing data of the sensor.

3. The sensor opening test system according to claim 2, wherein the processor is configured with the program to perform operations further comprising operation as a metadata setting changing unit configured to change a setting of the sensor-side test metadata to enable acquisition of the sensor-side test metadata by the sensor-side metadata acquiring unit, or to change a setting of the application-side test metadata to enable acquisition of the application-side test metadata by the application-side metadata acquiring unit.

4. The sensor opening test system according to claim 2, wherein the processor is configured with the program to perform operations further comprising operation as a test data reception state presenting unit configured to present a reception state of test data in the opening test application.

5. The sensor opening test system according to claim 2, wherein the sensor identifier comprises a UUID (Universally Unique Identifier).

6. The sensor opening test system according to claim 1, wherein the processor is configured with the program to perform operations comprising operation as a metadata setting changing unit configured to change a setting of the sensor-side test metadata to enable acquisition of the sensor-side test metadata by the sensor-side metadata acquiring unit, or to change a setting of the application-side test metadata to enable acquisition of the application-side test metadata by the application-side metadata acquiring unit.

7. The sensor opening test system according to claim 6, wherein the processor is configured with the program to perform operations further comprising operation as a test data reception state presenting unit configured to present a reception state of test data in the opening test application.

8. The sensor opening test system according to claim 6, wherein the sensor identifier comprises a UUID (Universally Unique Identifier).

9. The sensor opening test system according to claim 1, wherein the processor is configured with the program to perform operations comprising operation as a test data reception state presenting unit configured to present a reception state of test data in the opening test application.

10. The sensor opening test system according to claim 9, wherein the sensor identifier comprises a UUID (Universally Unique Identifier).

11. The sensor opening test system according to claim 1, wherein the sensor identifier comprises a UUID (Universally Unique Identifier).

12. A sensor opening test management terminal in a sensor opening test system that, with respect to sensor-side test metadata for opening testing only, the sensor-side test metadata including at least a sensor identifier uniquely identifying a sensor configured to output sensing data or a network adaptor connected to the sensor and configured to transmit sensing data to a network and application-side test metadata for the opening testing only, the application-side test metadata comprising metadata of an opening test application for the opening testing of the sensor only, the metadata including at least the sensor identifier, the opening test application being configured to check whether or not an application device in which the opening test application is installed can receive data from the sensor, determines matching of the sensor-side test metadata and the application-side test metadata, based on a sameness of the sensor identifiers, and performs the opening testing of the sensor or the network adaptor, the sensor opening test management terminal comprising a processor configured with a program to perform operations comprising:

operation as a setting changing unit configured to change a setting of the sensor-side test metadata or the application-side test metadata, such that the sensor-side test metadata or the application-side test metadata is targeted for matching; and operation as a presenting unit configured to present a reception state, in the opening test application, of test data transmitted from the sensor or network adaptor.

13. A sensor in a sensor opening test system that, with respect to sensor-side test metadata for opening testing only, the sensor-side test metadata including at least a sensor identifier uniquely identifying a sensor configured to output sensing data and application-side metadata for the opening testing only, the application-side test metadata comprising metadata of an opening test application for the opening testing of the sensor only, the metadata including at least the sensor identifier, the opening test application being configured to check whether or not an application device in which the opening test application is installed can receive data from the sensor, determines matching of the sensor-side test metadata and the application-side test metadata, based on a sameness of the sensor identifiers, and performs the opening testing of the sensor, the sensor comprising:

a sensor configured to output sensing data;

an opening test data transmitting unit provided with a function of a normal mode for transmitting the sensing data and a sensor opening test mode, and configured to transmit test data when in the sensor opening test mode; and a presenting unit configured to present a reception state, in the opening test application, of test data transmitted from the sensor.

14. The sensor according to claim 13, wherein the processor is configured with the program to perform operations further comprising operation as a setting changing unit configured to change a setting of the sensor-side test metadata or the application-side test metadata, such that the sensor-side test metadata or the application-side test metadata is targeted for matching.

* * * * *